United States Patent [19]

Hargrove

[11] 4,104,694

[45] Aug. 1, 1978

[54] ASYNCHRONOUS DIGITAL LOCKING SYSTEM

[76] Inventor: Daniel J. Hargrove, 4306 NE. 6th Ave., Ft. Lauderdale, Fla. 33308

[21] Appl. No.: 736,715

[22] Filed: Oct. 28, 1976

Related U.S. Application Data

[63] Continuation-in-part of Ser. No. 520,460, Nov. 4, 1974, abandoned.

[51] Int. Cl.[2] .......... H04Q 9/00

[52] U.S. Cl. .......... 361/172; 340/164 R

[58] Field of Search .......... 361/172; 340/147 R, 340/6, 147 MD, 164 R, 164 A, 167 R, 168 R, 168 S

[56] References Cited

U.S. PATENT DOCUMENTS

| | | | |
|---|---|---|---|
| 3,811,112 | 5/1974 | Hoven et al. | 340/164 R |
| 3,852,722 | 12/1974 | Neuville | 361/172 X |
| 3,872,435 | 3/1975 | Cestaro | 361/172 X |

*Primary Examiner*—Harry E. Moose, Jr.

*Attorney, Agent, or Firm*—Malin & Haley

[57] ABSTRACT

An asynchronous digital electronic combination locking system including a hand-held transmitter means for providing timed and coded transmission data, and a receiver for providing timed and coded receiver data and comparing the receiver data with the incoming transmission data. The door locking apparatus is opened only when said timed and coded data matches.

12 Claims, 6 Drawing Figures

ASYNCHRONOUS DIGITAL LOCKING SYSTEM

BACKGROUND OF THE INVENTION

This is a continuation-in-part of application Ser. No.520,460 filed Nov. 4, 1974 entitled Asynchronous Digital Locking System by Daniel J. Hargrove, now abandoned.

An asynchronous digital electronic combination locking system, and more particularly a hand-held transmitter for providing timed and coded data to a receiver for comparison with timed and coded receiver data.

In the past, mechanical locks have been found to be easily bypassed. A variety of electronic locks have been designed to provide decoders that recognize an incoming combination of numbers, sequences and spacings of digits.

BRIEF DESCRIPTION OF THE INVENTION

An asynchronous digital locking system comprising a transmitter means and a decode receiver means. The transmitter means is powered by current from the decode receiver means of locking station and the timed and coded data is transmitted upon actuation of a switching means. The transmitter includes a transmitter clock, switching means, and a parallel to serial shift register that provides the coded data when the particular input from the transmitter clock is enabled into the shift register. The asynchronous digital locking receiver means includes a data means, door locking means, and a receiver clock means for providing a squara wave output to the binary counters when it is enabled by the transmitter data signal. The receiver clock means preferably has a clock source eight times that of the transmitter clock. The data means includes data decode means and a timing match means. The decode means includes a serial to parallel shift register and data decoder.

In operation, the hand-held transmitter is connected with the receiver input connection attached to the outside of a door. The male jack of the transmitter is inserted into the receiver plug. Then the transmitter switch is actuated by depressing the button, upon release of the button a preset code is forwarded to the receiver. Upon receipt the receiver provides a match or mis-match response. If the code in the receiver matches the transmitted code a relay signal will unbolt the door locking apparatus. Thereafter, the door may be opened. Upon returning the door to a closed position the relay is de-energized and the bolt will return to its normally closed and locked position.

A receiver opening switch is connected adjacent the inside of the door. The receiver opening switch provides a direct relay signal that unbolts the door locking apparatus. The relay is returned to its normally closed and locked position only after the door is returned to a closed position.

It is an object of this invention to provide an electronic digital locking system that is difficult to circumvent.

Another object of this invention is to provide an asynchronous locking system.

A further object of this invention is to provide a non complex locking system having over 100,000 different possible clock frequencies that may be utilized.

A further object of this invention is to provide a digital locking system having over 32 different combinations that may be utilized on the same frequency.

An additional object of this invention is to provide a data means that recognizes a combination only if it has the correct number, sequence, and timed digits.

An additional object of this invention is to provide in a locking system with a deterrent against electrical random or computerized lock picking.

Still another object of this invention is to provide a time constant that multiplies the number of combinations available for the locking system.

In accordance with these and other objects which will be apparent hereafter, the instant invention will now be described with particular reference to the accompanying drawings.

DESCRIPTION OF A PREFERRED EMBODIMENT

Figure 2:
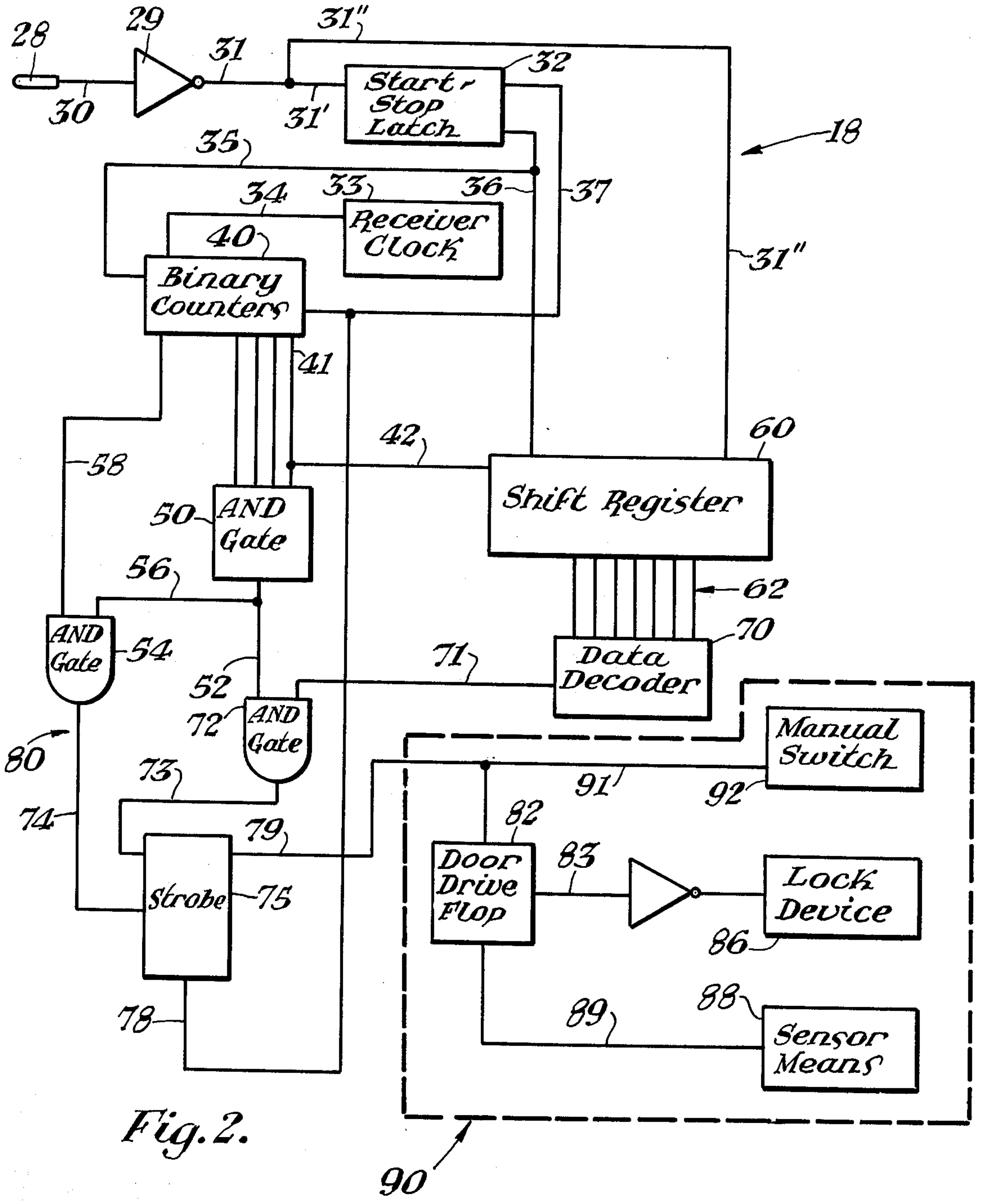
FIG. 2 is a block diagram of the receiver.
Figure 1:
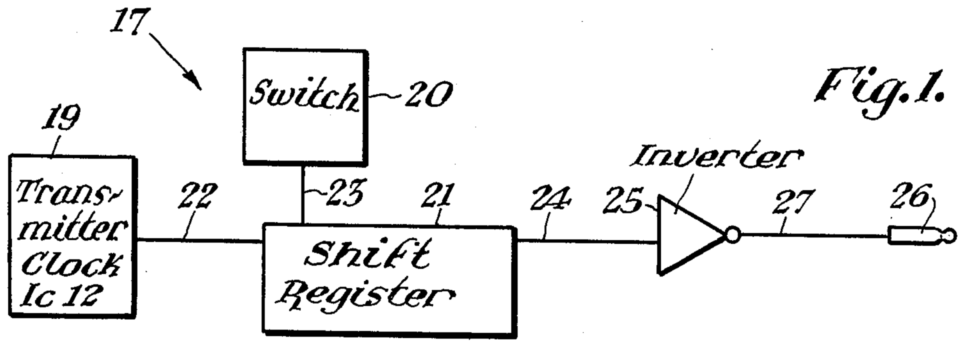
FIG. 1 is a block diagram of the transmitter.

Referring now in detail to the drawings, wherein an embodiment of the invention is shown, and, referring particularly to FIGS. 1 and 2, the asynchronous digital locking system or asynchronous electronic combination locking system comprising a transmitter means or electrical transmitter circuit generally, referred to by numeral 17, and a decode receiver means or electrical receiver circuit means, generally referred to as numeral 18. The transmitter means may include switch 20, shift register 21, inverter 25, and plug 26. The portable transmitter 17 is connected to the receiver 18 for power from the receiver and to provide a timed and coded sequence of a number of digits. The transmitter 17 includes a transmitter clock 19 or transmitter means that are actuated by the receiver current when the transmitter start switch 20 is actuated the transmitter circuit provides an asynchronous timed and coded signal . A parallel to serial shift register 21 receives the transmitter clock output and provides the particular coded data from the particular transmitter clock 19 which may be a quadruple 2-input positive and gate, such as 7400, and shift register 21. Pin 2 of the register 21 is a clock source. The transmitter clock has a square wave output and is connected as shown in FIG. 1 to the parallel to serial shift register 21, I*c* 1, by connection means 22. A 74165 I*c* 1 may be used. The start switch 20 may be a single pole double throw switch with spring return that returns the switch to a first position. The start switch 20 is connected to the parallel to serial shift register 21 by connection means 23. The output signal from the parallel to serial shift register 21 is transmitted through connection means 24 to the driver-inverter 25. The driver and inverter 25 is connected to the male connecting plug 26 by connection means 27.

Referring now to FIG. 2, the asynchronous digital locking receiver 18 includes a receiver clock means such as receiver clock 33 and Binary counter 40, and data and time comparator means, such as the data means 60, 70 and gates 50, 54, 72 ans strobe 75. The receiver clock 33 provides a square wave output to the binary counters 40 when enabled by the transmitter signal. The clock 33 preferably has a clock source eight times that of the transmitter clock 19. The receiver 18 also includes data means and a door locking means 90. The data means includes a data decode means and a timing match means. The data decode means includes a serial to parallel shift register 60 and data decoder means 70. The timing match means includes a timing decode means 50 and a gating means generally referred to by numeral 80.

A receiver input plug 28 is connected adjacent the outside of the locked door. The input plug 28 is connected to Ic 3, designated by numeral 29 through line 30. The Ic 3 is a hex inverter — driver, such as Ic (7404). The hex inverter 29 is connected to the start stop latch 32 and to the serial to parallel shift register 60, such as Ic 6, (74164). The hex inverter 29 is connected to the start stop latch through connecting means 31 and 31′. The hex inverter 29 is connected to the serial to parallel shift registers 60 through connecting means 31 and 31′. Connecting means 31″ carries the transmitter timed and coded transmission data to the shift register 60. A receiver clock 33 which may be the same type chip as 19, Ic 13 (7400), is connected to binary counters 40 through connecting means 34. The binary counters may be an Ic 7 (74197) and Ic 8 (74197). The output from the start stop latch 32 is transmitted to the binary counters 40 through connection means 35. The input signal initiated by the transmitter enables latch or a start-stop means 32 which in turn enables the binary counters 40. In the middle of the first data bit the binary counters 40 allows the serial to parallel shift register 60 to be clocked in by transmitting a signal from the binary counter through connecting means 41 and 42.

The start stop latch 32 also provides an enabling signal through connecting means 36 to the serial to parallel shift register 60.

The information from the serial to parallel shift register 60 is transmitted through connecting means 62 to the data decoder 70, such as Ic 9 (7421) and Ic 10 (7421). The data decode means is a dual 4-input positive and gates. When the data decode means is true, a signal will be transmitted from the data decoder 70 to the and gate 72 through connecting means 71.

The output of the binary counters 40 passes through the and gate 50, such as Ic 9 (7421), a dual four input positive and gates. The time to compare signal from and gate 50 is transmitted to and gate 72 through connecting means 52. And gate 72 receives the signal from the data decoder 70 through connecting means 71 and the output from the and gate 50 through lines 52 to provide a steering input to strobe 75. Data true will be presented to the and gate 72 through connecting means 71. The time true is transmitted from the and gate 50 through connecting means 52. And gates 72 presents an output of data and time true in connecting means 73.

The time to compare signal from and gate 50 is also transmitted to and gate 54 through connecting means 56. The binary counters 40 are connected through connecting means 58 to the and gate 54. Connecting means 56 presents time true to the input of and gate 54. The output of and gate 54 strobes the flip/flop 75 to be strobed only in the middle of a data compare true and clock eight times. The device provides a second point check or mid point check for data true and time true to be compared during the time true or the middle of time true, which is sync up.

The and gate 72 may be Ic 16 (7408), a quadruple two-input positive and gates. The strobe 75, Ic 11 (7474), is a flip/flop.

The strobe 75 is reset by signal from Ic 8 pin 2 through connecting means 37 and 37′ to driver Inverter 42, Ic 3 through connecting means 78 to pin 1 of Ic 11. Also, in FIG. 4, the reset signal from pin 2 is connected through connecting means 37 and 37″ to pin 5 of Ic 5 of the start stop latch 32.

Figure 4:
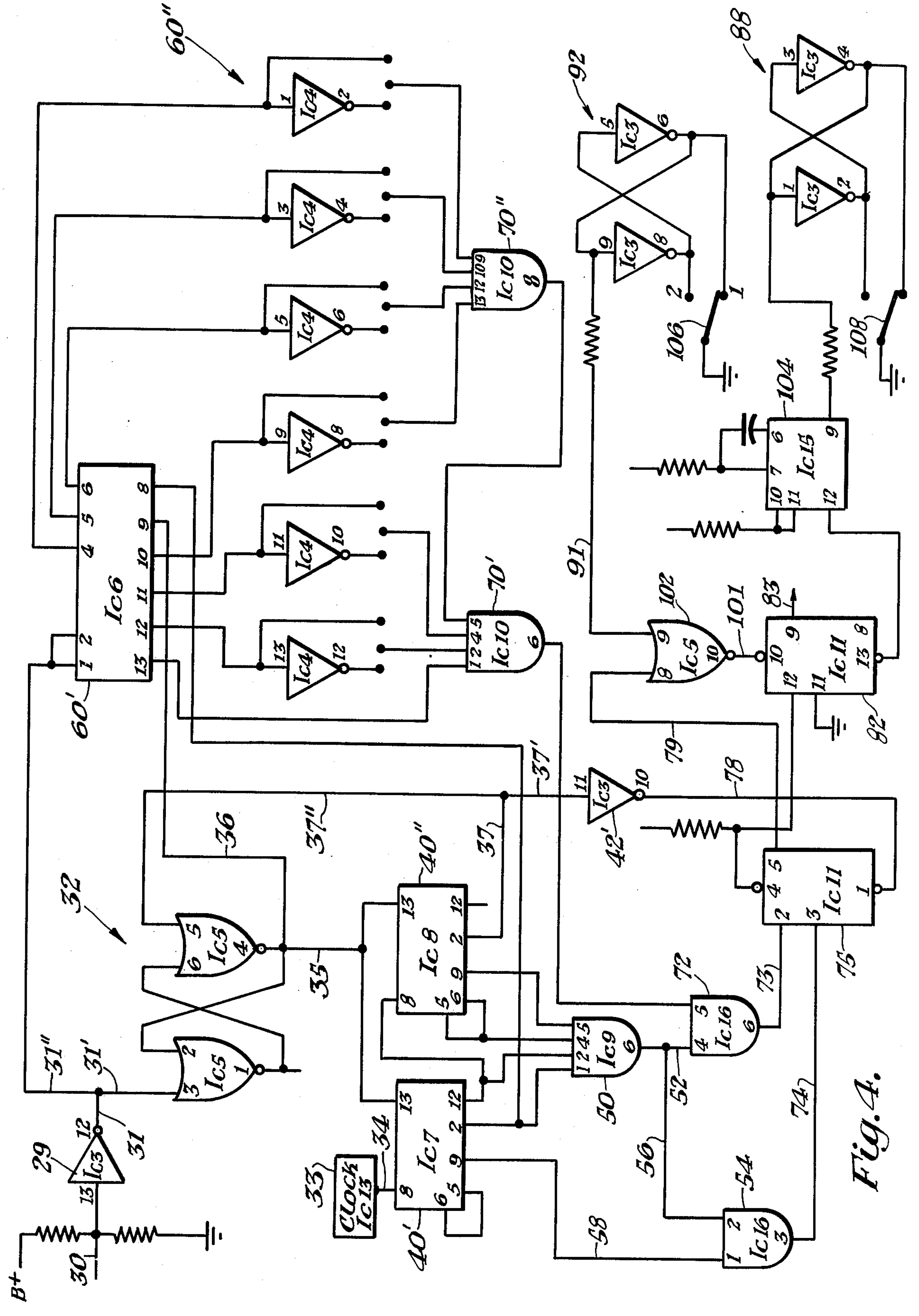
FIG. 4 is a schematic block diagram of the receiver.

The strobe provides an output signal through connecting means 79 to door driver flop 82 through nor gate 102 shown in FIG. 4. Nor gate 102 is connected to door driver flop 82 through connector means 101. The nor gate 102 allows the door driver flop 82 to be controlled by the automatic control over line 79 or by the manual control over line 91. The output control from pin 9 of the door driver flop 82 passes through line 83 to the lock device 86. The electromagnetic device or lock device 86 moves the door bolt into an unlocked position. The bolt may also be moved to an unlocked position by manual switch 106 that provides a signal connecting means 91. Thereafter the door will remain unlocked until the sensing means 88 senses that the door has been opened, and thereafter, closed. Upon the closing of the door, the sensor 88 will provide a signal through line 89 to the door reset means 82. The door reset means actuates the driver 84 and the locking device 86 to move the locking bolt into a locked position. The locking means is shown in FIG. 2 by the numeral 90 and the dotted lines.

Figure 3:
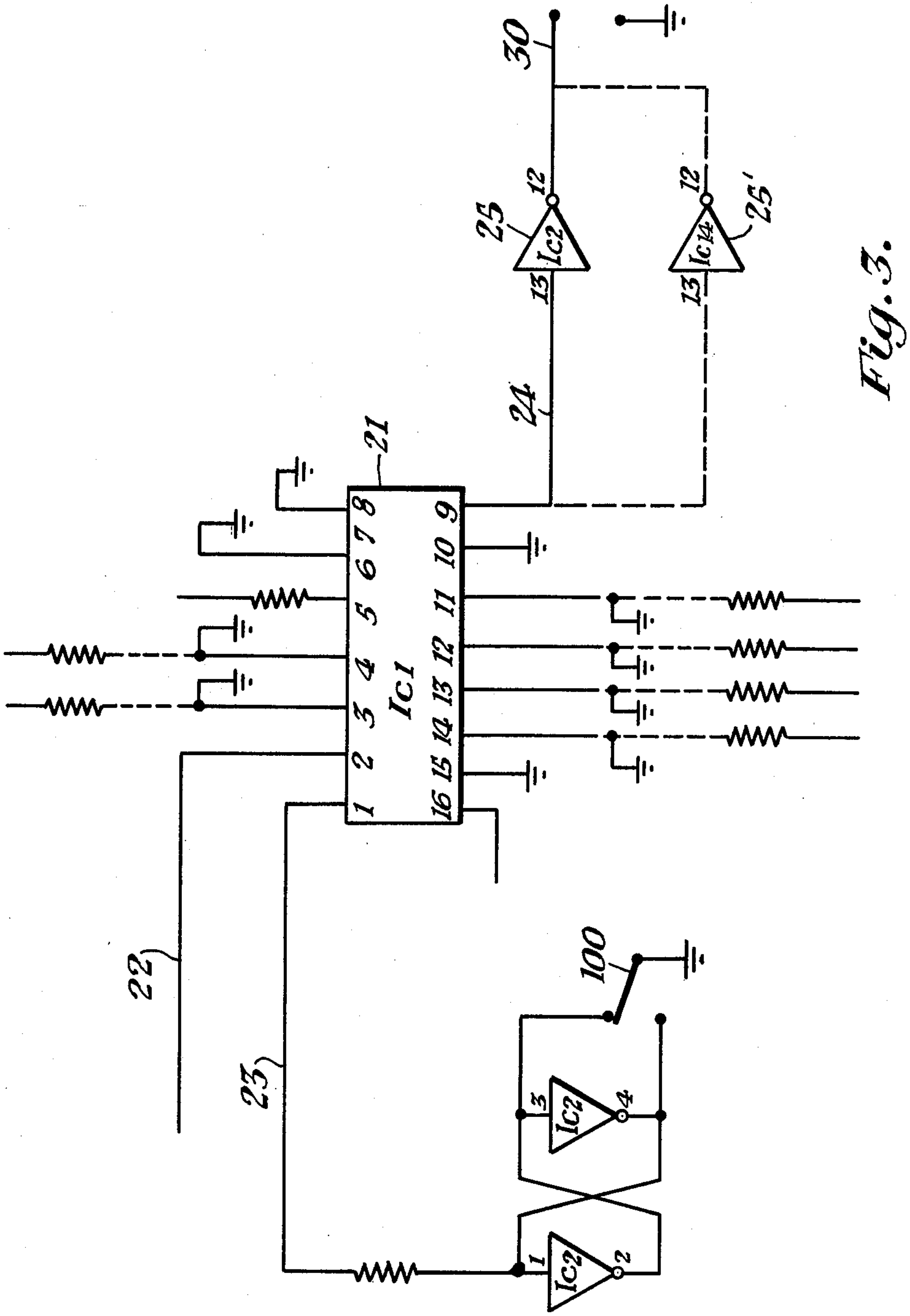
FIG. 3 is a schematic block diagram of the transmitter.

In operation of this device and referring now to FIG. 3, the operation begins by actuating switch 100 from position one shown to position 2; a low is present at pin 1 of Ic 1 the shift register 21. This loads the parallel data into Ic 1. The data that is loaded in, depends on the inputs on pins 3, 4, II, 12, 13, and 14 of Ic I. If the pin is connected to a 1,000 ohm resistor, which is connected to 5 volts, a one (or a high) is loaded in. If the pin is grounded, a zero is loaded in (or a low). Pin 5 of Ic 1 is always tied to a 1,000 ohm resistor (always high); this is a start bit and also a data bit. Pin 6 of Ic 1 is always grounded. When switch 100 returns to position 1 as shown, the transmitter clock is connected inside Ic 1 and the data that was loaded into Ic 1 is now shifted out of pin 9 of Ic 1.

The output of Ic 1 pin 9, is put into a driver/inverter 25 chip, a hex inverter Ic 2 (7404). Ic 2, pin 13 is the input and pin 12 is the output. Ic 2, pins 13 and 12 may not be used if the transmission line is more than ten feet. Instead pin 9 of Ic 1, will be connected to Ic 14, driver-/inverter 25, pin 13 and the output will be pin 12 of Ic 14. Ic 14 may be a 7406, which is an open collector chip. Ic 14 will driver more current and voltage than Ic 2.

Referring now to FIG. 4, the input of the receiver is a hex inverter/driver 29, and Ic 3, at pin 13. The Ic 3, pin 13 is tied to a pull-up resistor network and to 5 volt power supply so that the output will stay low until actual data is fed into line 30. If Ic 14, driver/inverter 25′, is used on the transmitter, a 220 ohm resistor is tied to 5 volts and pin 13, instead of a 1,000 ohm resistor. Also a 330 ohm resistor is placed from pin 13 to ground.

The start stop latch 32 includes two quadruple 2-input positive nor gates, Ic 5 (7402). Upon transmission of data, the first data bit will be a high on Ic 5, pin 3. When this happens, the output, pin 4 of Ic 5 goes high. This allows Ic 7 and 8, the binary counters 40, to start clocking. Also the high of Ic 5, pin 4, goes to shift register 60′, Ic 6, pin 9, which will enable data to be clocked in. The output of Ic 3, pin 12 is connected to pins 1 and 2 of Ic 6, which is data input to Ic 6.

The Ic 7, pin 13 is high, as is pin 13 of Ic 8. This starts the counter (which has a clock source eight times that of the transmitter clock), to start counting up. In the middle of the first data bit; pin 2 of Ic 7 goes from a low to a high (which is also tied to Ic 6, pin 8, clock source for Ic 6) and allows the first data bit to be clocked into Ic 6. As the next data bit comes to Ic 6, pins 1 and 2; Ic 7, pin 2, will be going from a low to a high again allowing data to be shifted into Ic 6. And so down the line the data shifts in and the counter counts up.

When the counter reaches a count of eight (in reference to pin 2 of Ic 7), there will be a high on pin 6 of Ic 9. This is time to compare data.

When the shift register Ic 6, pin 8, has clocked eight times, all the data bits have been shifted in. Seven bits from the transmitter have been shifted in eight times into the shift register 60′, Ic 6 (74164). The shift register is an 8 bit serial to parallel shift register. We do not compare pin 3 of Ic 6, because we are only concerned with seven bits with the transmitter that is being used.

The data decoder 70 includes Ic 10 shown as 70′ and Ic 10 shown as 70″. For data decode to be true, there must be a high out of Ic 10, pin 6. To obtain this, all highs have to be on pins 1, 2, 4, 5, 13, 12, 10, 9 of Ic 10. Pin 13 of Ic 6 is the start bit and will always be high. This is with comparison to pin 5, of Ic 1, of the transmitter. If pin 4 of Ic 1 is a high, pin 12 of Ic 6 will be high and put a high on Ic 10 pin 2. If pin 4 of Ic I is a low, a low will be on pin 12 of Ic 6, at which point Ic 4 hex inverters (7404), pin 13 will be connected to pin 12, of Ic 6 and Ic 4, pin 12 will be connected to Ic 10, pin 2. If pin 3, of Ic 1 is high; pin 11 of Ic 6 will be high and connected to pin 4 of Ic 10. If pin 3 of Ic I is a low; pin 11 of Ic 6 will be low and pin 11, of Ic 4 will be connected to pin 11 of Ic 6. Pin 10, of Ic 4 will be connected to pin 4 of Ic 10.

PIN COMPARE CHART

| Ic 1 | Ic 6 |
|---|---|
| 5 | 13 |
| 4 | 12 |
| 3 | 11 |
| 14 | 10 |
| 13 | 6 |
| 12 | 5 |
| 11 | 4 |

If any of the pins of Ic 1 are low, Ic 4, shown as 60″, will be used between the output pins of Ic 6, to the input pins of Ic 10.

When data decoded is true, there will be a high on Ic 10 pin 6. This signal is anded with clock eight time being true (output of Ic 9 pin 6), to give a high out on Ic 16, pin 6. Ic 16, pin 6, is connected to pin 2 of Ic 11, which is the sterring input of Ic 11 flip/flop. This signal will only be true for one complete clock pulse. To set the flip/flop, pin 3 must go from a low to a high during this time. This is accomplished by anding clock eight time, Ic 9, pin 6, and Ic 7, pin 9. During the clock eight time and when pin 9 of Ic 7, is going from a low to a high, will we strobe Ic II, pin 3. The strobe of the flip/flop is actuated, it will only be actuated in the middle of data compare true and clock eight time. Pin 5 of Ic 11 will be high for half a clock pulse (reference to clock of Ic 7, pin 2). This high out of pin 5, of Ic 11 is nor'd gate and a low pulse on Ic 11, pin 10 sets the flip/flop to drive the relay.

The reason pin 5, of Ic 11 is only high for half a clock pulse is because the flop was strobed in the middle of clock eight time. When clock nine time happens, pin 2 of Ic 8, is high and resets the start-stop latch, the counter and Ic 6. Also a low is put to Ic 11, pin 1 by way of an inverter Ic 3, pins 11 and 10, which resets Ic 11 pin 5, to a low.

The flip/flop to drive the relay is set and will stay set until a low pulse is applied to pin 13, of Ic 11. This is done with Ic 15 (74123), a retriggerable monostable multivibrator 104 and switch 108. When the door is closed, pin 9 of Ic 15 is low. When the door opens, pin 9 of Ic 15 goes high. When the door closes again, pin 9 of Ic 15 goes low. When this happens (the high to a low on pin 9 of Ic 15), pin 12 of Ic 15 goes from a high to a low and returns to a high. How long this pulse stays low depends on the value of the capacitor and the resistor, pin 6 and 7 of Ic 15. This resets the drive flop and the door relay closes again.

The door is open from the inside by pushing switch 106, this switch is nor'd gate into the set side of the drive flop. The flop is reset when the door is closed. This device is an asynchronous device for the transmission of data in which each character of the information is to lock one element of a system into step with another individually, that is, synchronized individually, usually by the use of start and stop elements. This apparatus locks the receiver to the transmitter at a predetermined bit rate to the data set frequency.

Figure 5:
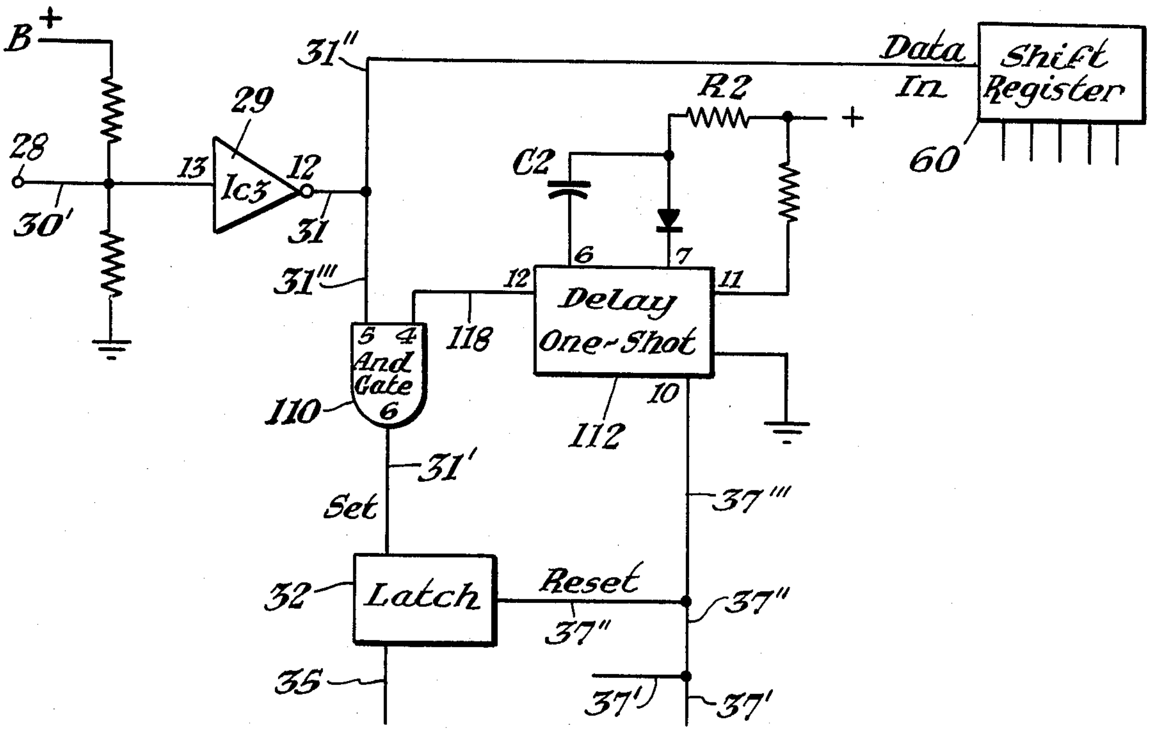
FIG. 5 is a schematic diagram of the receiver delay circuit.
Figure 6:
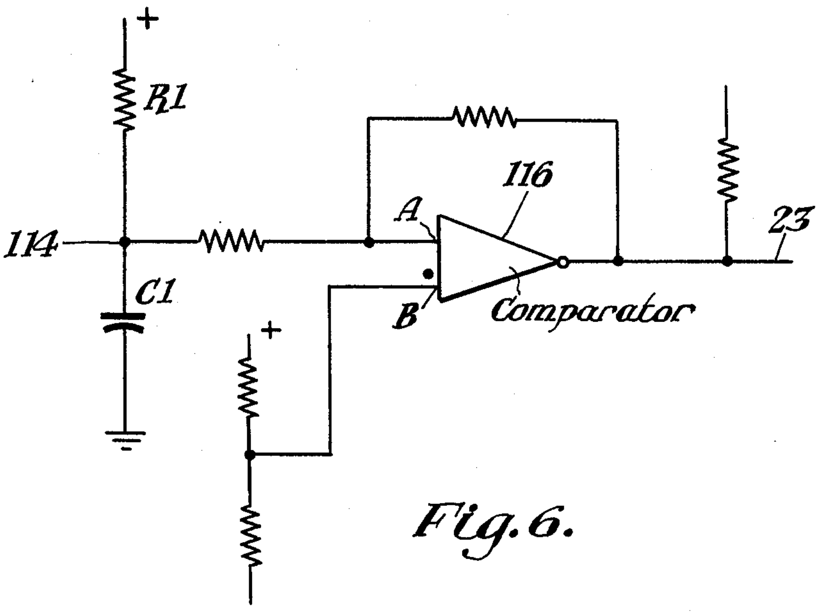
FIG. 6 is a schematic diagram of the transmitter programmable means.

An additional feature of this locking system is shown in FIGS. 5 and 6. This feature is an electrical random or computerized lock picking deterrent and/or time constant system.

The start data switch 20 in FIG. 1 is replaced with a programmable and/or variable $r1 \times c1$ (resistance times capacitance) which varys the time in which data is sent to lock, as shown in FIG. 6. When the key is inserted (power up) circuit point 114 starts rising in voltage.

Upon insertion of key 17 as amended by FIG. 6, into jack, power is applied to key. Input B on comparator 116, an LM339, is the threshold point, of the comparator 116. When the voltage at point A, of comparator 116 rises above B level, the output changes from a low to a high, allowing data to be transmitted to lock. The R1 and C1 can be varied in the initial production. This in turn varys the time when data is sent to lock after insertion, thereby also providing a particular (programmable) time constant.

Referring now to FIG. 5, when a key is inserted into jack 28, an extremely short pulse at 30′ is detected in the system because of key being inserted. This pulse hits the start-stop latch 32, same as FIGS. 2 and 4, and the counter 40 of FIG. 2 counts up. When counter 40 reaches its end, this pulse resets the start-stop latch as set forth above and is ready for another try.

With the addition of the circuitry shown in FIG. 5, which is an and gate 110 along with a one shot monostable (74132) multivibrator 112 when the reset pulse comes around, this fires the one shot multivibrator 112 with an output that goes from a high to a low and back to a high on line 118. The amount of time that this output stays low depends on $R2 \times C2$ = time of low. R2 and C2 are also programmable.

When the key shown in FIGS. 1 and 3 as amended by FIG. 6 is inserted in jack 28′, a pulse is detected in lock and the counter runs, resets pulse fires one-shot 112 upon completion of one-shot cycle from high to low back to high, the R1 × C1 in the key shown in FIG. 6 has now reached its threshold point and allows data to be transmitted to lock through the jack 28', sending right code at the correct baud rate or transmission rate, that is the clock rate as set forth above, transmitted at the correct time. This provides data times baud rate times when to send data. (T.C.) This provides an additional time constant that multiplies the number of combinations available for locking.

This correct time to be transmitted also may be used as a detergent against computerized or random packaging. With a delay of 2 sec. 6 million combos it could take up to 12 million seconds or 180 days to randomly pick the lock.

The method of programming data means only, in key by using wires (handwired) to tie input's (11, 12, 13, 14, 3 and 4) of parallel to serial shift reg. 21 either high or low. A method of programming data means only in lock by using wires for decoding output serial to Parallel shift Reg. 60 in Lock to data decode means, 70, for example hardwire pin 12 of IC4 (60'') to pin 2 of Ic10 (70') or to pin 13 of FCY (60''.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An electronic combination locking system including a binary electrical transmitter circuit and a binary electrical receiver circuit means in which the transmitter circuit signal to the receiver circuit enables the receiver clock comprising:

said transmitter circuit including, a transmitter clock, and a transmitter means connected to said transmitter clock for providing an timed and coded signal, and said transmitter means connectable to said receiver circuit means, and said transmitter means includes at least one parallel to serial shift register, said receiver circuit means including, a receiver clock means, a start-stop means connected to said receiver clock means, said start-stop means connectable to said transmitter means for enabling said receiver clock means by receipt of said timed and coded signal, and data and time comparator means connected to said receiver clock means for decoding the timed and coded signal and providing a true code at true time output signal for operating locking means when the receiver circuit means is connected to said transmitter means.

2. An electronic combination locking system as set forth in claim 1 wherein;

said parallel to serial shift register is connected to said transmitter clock, and the output signal of said transmitter clock is slower than the output of said receiver clock.

3. An electronic combination locking system as set forth in claim 2 wherein, the data and time comparator means includes a data decoder means connectable to said transmitter means and a timing match means connected between said data decoder means and said receiver clock means to provide said output signal.

4. An electronic combination locking system as set forth in claim 3 wherein, said decode means includes at least one shift register connectable to said transmitter means, and a data decoder connected to said shift register, said data decoder is connected to said timing match means to produce said output signal.

5. An electronic combination locking system as set forth in claim 3 wherein, said transmitter means includes a receiver connection means, a coded signal control means having an output connected to said receiver connection means, said coded signal control means providing a timed sequence of at least one digital signal in a combination to said receiver connection means;

means connected to said transmitter means for initiating the transmitted signal, and said transmitter clock connected to said coded signal control means for providing a timed and coded signal, and said receiver circuit means including said start-stop means connected to said decode means, a transmitter connecting means connected to said start-stop means, locking means and means connected to said output signal to open said locking means, said locking means including, a lock device and a sensor means to re-lock said lock device, and said receiver clock means includes a clock and at least one binary counter.

6. An electronic combination locking system as set forth in claim 5 wherein;

said shift register having means to accept at least seven data bits; and said coded signal control means includes at least one shift register having means to transmit at least seven data bits.

7. An electronic combination locking system as set forth in claim 1 further including, a locking device, and means connected to said output signal to energize said locking device.

8. An electronic combination locking system including an electrical transmitter circuit and an electrical receiver circuit means in which the transmitter circuit signal to the receiver circuit enables the receiver clock comprising:

said transmitter circuit including, a transmitter clock, and a transmitter means connected to said transmitter clock for providing an timed and coded signal, and said transmitter means connectable to said receiver circuit means, said receiver circuit means including;

a receiver clock means, a start-stop means connected to said receiver clock means, said start-stop means connectable to said transmitter means for enabling said receiver clock means by receipt of said timed and coded signal, and data and time comparator means connected to said receiver clock means for decoding the timed and coded signal and for providing a true code at true time output signal for operating locking means when connected to said transmitter means, the data and time comparator means includes a data decoder means connectable to said transmitter means and said timing match means connected between said data decoder means and said receiver clock means to provide said output signal, and said timing match means includes a second time match means to provide a second point check for data true and time true to be compared during time true.

9. An electronic combination locking system as set forth in claim 8, wherein:

said receiver means provides power to said transmitter means.

10. An electronic combination locking system comprising:

a transmitter means providing a timed and codes signal, and a receiver means connectable to said transmitter means, said receiver means including a receiver clock means connectable to said transmitter means, said transmitter means enables said receiver clock means, data means for decoding the coded signal at right time, said data means connected to said receiver clock means for providing a true code at true time output signal, and a programmable means connected to said transmitter means for transmitting data at a selected correct time, said receiver means including a delay means inhibiting data which is transmitted prior to the selected correct time.

11. An electronic combination locking system as set forth in claim 10 including:

additional means connected to said receiver means to deter use of the system random picking.

12. An electronic electrical key comprising:

a circuit including transmitter clock means;

a parallel to serial shift register connected to said transmitter clock means, a programmable means connected to said shift register for transmitting data at a selected correct time, and means for input power and for transmitting output connected to said shift register.

* * * * *